United States Patent
Barber

[11] Patent Number: 6,051,201
[45] Date of Patent: Apr. 18, 2000

[54] PREPARATION OF PHOSPHATIC FEEDSTOCK FROM PHOSPHORUS-CONTAINING WASTE

[75] Inventor: James C. Barber, Florence, Ala.

[73] Assignee: James C. Barber and Associates, Inc., Florence, Ala.

[21] Appl. No.: 09/106,787

[22] Filed: Jun. 25, 1998

[51] Int. Cl.$^7$ ............................ C01B 25/01; C01B 25/02
[52] U.S. Cl. ............................................ 423/322; 423/323
[58] Field of Search ...................................... 423/322, 323

[56] References Cited

U.S. PATENT DOCUMENTS

| | | | |
|---|---|---|---|
| 2,039,297 | 5/1936 | Curtis | 423/322 |
| 2,267,077 | 12/1941 | Burke | 423/323 |
| 3,104,952 | 9/1963 | Hartig | 423/322 |
| 4,608,241 | 8/1986 | Barber | 423/322 |
| 4,689,121 | 8/1987 | Morgan | 423/323 |

FOREIGN PATENT DOCUMENTS

| | | | |
|---|---|---|---|
| 710257 | 5/1965 | Canada | 423/322 |
| 786727 | 6/1968 | Canada | 423/322 |
| 1091816 | 7/1966 | United Kingdom | 423/323 |

*Primary Examiner*—Wayne Langel
*Attorney, Agent, or Firm*—James H. Knebel

[57] ABSTRACT

Phosphorus furnaces were operated by the Tennessee Valley Authority (TVA) to produce elemental phosphorus beginning over the period 1936–1976. Elemental phosphorus was lost in phosphorus-containing waste throughout the 40 years TVA produced the element. Large quantities of phosphorus-containing wastes remain at the site where TVA produced the chemical.

Technology has not been available to treat phosphorus-containing waste so as to recover elemental phosphorus and produce an innocuous waste material. White phosphorus is a dangerous chemical and it is very toxic. Essentially all the elemental phosphorus must be recovered if an innocuous waste is produced. Commercial processes have not been available to recover elemental phosphorus from phosphorus-containing wastes.

Elemental phosphorus is produced commercially by smelting phosphatic material in electric furnaces. A process has been invented to prepare phosphatic feedstock from phosphorus-containing waste. The waste is heated in a temperature range which will volatilize white phosphorus and convert white phosphorus into red phosphorus. Thus phosphorus-containing wastes can be safely agglomerated to prepare phosphatic feedstock. Feedstock is heated to approximately 2700° F. in electric furnaces and red phosphorus is vaporized. White phosphorus is obtained when phosphorus vapor is condensed.

12 Claims, 1 Drawing Sheet

PREPARATION OF PHOSPHATIC FEEDSTOCK FROM PHOSPHORUS-CONTAINING WASTE

BACKGROUND OF THE INVENTION

The Tennessee Valley Authority (TVA) undertook development of the process for the production of elemental phosphorus soon after the agency was created on May 18, 1933. Although elemental phosphorus had been produced commercially by smelting phosphate ore in blast furnaces and in electric furnaces, both production methods needed further development.

A hazardous waste problem arose immediately after TVA undertook the production of elemental phosphorus. Phosphorus vapor was condensed by contacting the furnace gases with water, and the liquid phosphorus must be kept submerged in water to prevent its spontaneous combustion upon contact with air. A characteristic of the condensation process is that part of the phosphorus condenses as small particles. The phosphorus particles became associated with water and small solid particles to form an emulsion called phosphorus sludge. Solid particles in the furnace gas may result from abrasion of the furnace feed materials (phosphate, coke and silica rock) and by volatilization of solids in the furnace followed by their condensation as small particles.

It was difficult to cope with phosphorus sludge. An attempt was made to separate elemental phosphorus from the water and solids by sedimentary methods, but such separation was not very successful.

Phosphorus sludge is not a stable emulsion and gravity causes a partial break down and separation of elemental phosphorus. Storage of phosphorus sludge in tanks will result in the separation of phosphorus as a layer in the bottom of the tanks. Phosphorus particles coalesce during storage to form the liquid layer in the tanks, and the phosphorus can be removed by pumping. Unfortunately the viscosity of phosphorus sludge increases as the phosphorus separates. When phosphorus sludge is first formed the elemental phosphorus content may be about 68.9 percent as reported in "Production of Elemental Phosphorus by the Electric-Furnace Method," Tennessee Valley Authority, Chemical Engineering Report No. 3, 1952, page 167. After extended storage in tanks the elemental phosphorus content was found to be in the range of 7 to 30 percent and the viscosity had become too high for the material to be pumped. When phosphorus sludge is burned to produce phosphoric acid it was found that the elemental phosphorus content had to be a minimum of about 60 percent. Oxidation of elemental phosphorus to $P_2O_5$ is incomplete when the elemental phosphorus content is less than about 60 percent.

A 14-acre settling pond was provided to store accumulated phosphorus sludge at TVA. Also, phosphorus sludge was stored in sumps, tanks, railroad cars, and a landfill. Phosphorus sludge accumulated at other plants in ponds, sumps, and tanks.

One publication, "Recovery and Removal of Elemental Phosphorus from Electric Furnace Sludge,"I. J. Anazia, J. Jung and J. Hanna, *Minerals and Metallurgical Processing*, May 1992, reported that 5 to 10 percent of the phosphorus produced ends up in the sludge. Another reference, "The Recovery of Elemental Phosphorus from Phosphorus Bearing Sludges," Doctoral Thesis of William James Shaffner, The University of Western Ontario, 1975, states, "It has been reported by several workers that the phosphorus remaining in the sludges represents up to 3 to 5 percent of the total phosphorus produced." The first was probably for phosphorus furnaces operating without electrostatic precipitators to clean the furnace gas. The lower loss of 3 to 5 percent was for phosphorus furnaces operating with electrostatic precipitators.

After about 1939 phosphorus furnaces at TVA were equipped with electrostatic precipitators and loss of elemental phosphorus in phosphorus sludge was taken to be 4 percent. However, a waste was generated which was called precipitator dust. The precipitator dust contained elemental phosphorus that had absorbed on dust particles. About 20,000 tons of precipitator dust has accumulated at TVA.

All wastes that contain elemental phosphorus are called phosphorus-containing waste. This includes phosphorus sludge, phosphorus particles that have coalesced forming a layer under precipitator dust, and precipitator dust.

About 1.1 million tons of elemental phosphorus was produced over the approximately 40-year period the chemical was produced at TVA. From this it was estimated 45,800 tons of elemental phosphorus has accumulated in phosphorus-containing wastes at TVA.

The value of products that may be made from TVA's phosphorus-containing waste was estimated and the results are given in table 1.

TABLE I

Value of Products that Can Be Made from Phosphorus-Containing Waste at TVA

| Product | Million $ |
|---|---|
| Elemental phosphorus from phosphorus sludge | 114.6 |
| Elemental phosphorus from smelting precipitator dust | 6.9 |
| Byproduct ferrophosphorus from smelting precipitator dust | 0.1 |
| Elemental phosphorus from smelting inorganic solids in phosphorus sludge | 13.4 |
| Byproduct ferrophosphorus from smelting inorganic solids in phosphorus sludge | 0.2 |
| Total | 135.2 |

It is evident innovative technology is needed to recover the wastes so as to improve the overall economy of phosphorus production. Although byproduct ferrophosphorus will be produced when inorganic solids are smelted, nearly all the value from the wastes will be from recovery of elemental phosphorus and from production of the chemical when the inorganic solids are smelted.

DISCLOSURES IN THE INVENTION

Elemental phosphorus is a toxic chemical as reported in the following abstract from the technical publication, "Yellow Phosphorus Pollution: Its Toxicity to Seawater-maintained Brook Trout (Salvelinus fontinalis) and Smelt (Osmerus Mordax)", Fletcher, G. L., Hoyle, R. J., and Home, D. A., J. Fish. Res. Bd. Canada 27: 1379–1384.

Yellow phosphorus was lethal to seawater-maintained brook trout and smelt at concentrations as low as 0.5 ug/liter. Trout that were exposed to low concentrations of yellow phosphorus (0.5 and 7.0 ug/liter) for 50 or more hours turned red and showed signs of extensive hemolysis. At death, all trout that had been exposed to 104 ug/liter yellow phosphorus and lower had hematicrits that were significantly lower than those of the controls.

The proposed discharge limits of elemental phosphorus to surface streams is 0.1 ppb. TVA and the chemical industry sought technology that would convert phosphorus sludge into an innocuous waste and thereby protect marine life from inadvertent discharges of the toxic chemical. However, technology to quantitatively separate elemental phosphorus from inorganic solids in the waste was not forthcoming.

A different concept was pursued which resulted in U.S. Pat. No. 4,608,241. A process was disclosed in the patent which included distillation of phosphorus-containing waste to recover elemental phosphorus. When the phosphorus-containing waste is phosphorus sludge the residue is inorganic solids containing phosphorus compounds. The independent claim in U.S. Pat. No. 4,608,241 includes a step to agglomerate the inorganic solids and thereby prepare phosphatic feedstock for phosphorus furnaces.

The process disclosed in U.S. Pat. No. 4,608,241 avoids the problem of quantitatively separating elemental phosphorus from the inorganic solids. Elemental phosphorus remaining in the solids after distillation will be recovered when the feedstock is smelted. At TVA elemental phosphorus recovered from the phosphorus sludge will have an estimated value of $114.6 million, as shown in table 1.

TVA discontinued production of elemental phosphorus in 1976 and the production units have been dismantled. Elemental phosphorus spontaneously ignites when it is exposed to air and transportation of phosphorus-containing waste to a phosphorus furnace will entail hazards. Phosphorus-containing waste, however, can be distilled and still residue can be converted into phosphorus furnace freedstock at the waste site, thus avoiding transportation of the waste. Further development of the process disclosed in U.S. Pat. No. 4,608,241 is needed to prepare an innocuous feedstock.

OBJECTS OF THE INVENTION

Following is a brief summary of the objects of the invention.

1. Provide a new process for making phosphorus furnace feedstock.
2. Complete development of the process disclosed in U.S. Pat. No. 4,608,241 for the recovery of elemental phosphorus from phosphorus-containing wastes.
3. Complete development of the process disclosed in U.S. Pat. No. 4,608,241 for the recycle of inorganic solids in phosphorus-containing wastes.

PRIOR ART

The following publications provide background information on the preparation of phosphorus furnace feedstock and on the chemical and physical requirements of the feedstock in order to produce elemental phosphorus by smelting.

Tennessee Valley Authority, Chemical Engineering Report No. 3, 1952, R. B. Burt and J. C. Barber. The report is entitled "Production of Elemental Phosphorus by the Electric-Furnace Method".

Tennessee Valley Authority, Chemical Engineering Report No. 4, 1950, E. L. Stout. The report is entitled, "Agglomeration of Phosphate Fines for Furnace Use".

Journal of Metals, December 1962, "Phosphorus Furnace Operations; How Are They Affected by Various Types of Phosphate Charges?", J. C. Barber and E. C. Marks.

Chapter VII.2 from the book "Solid Wastes" edited by C. L. Mantell, John Wiley and Sons, Inc. The chapter is entitled "Solid Wastes from Phosphorus Production".

The following patents were cited as prior art in U.S. Pat. No. 4,968,499, James C. Barber, Nov. 6, 1990.

U.S. Pat. No. 2,040,081, Mar. 12, 1936, Harry A. Curtis. A process is disclosed for the agglomeration of finely ground phosphate in a pug mill.

U.S. Pat. No. 3,034,383, May 15, 1962, T. P. Hignett, Alvin B. Phillips and Ronald D. Young. A process is disclosed for agglomeration of a fertilizer mixture where superphosphate is the binder.

U.S. Pat. No. 3,202,744, Aug. 24, 1965, J. C. Barber, George H. Megar and Thomas S. Sloan. Phosphorus sludge is used as binder to briquet phosphorus furnace feed.

U.S. Pat. No. 3,335,094, Aug. 8, 1967, W. J. Darby. This is a process for preparing a briquetted mixture of phosphate, silica, and coke having a high electrical resistance.

U.S. Pat. 3,531,250, Sep. 29, 1970, Arnulf Hinz, Heinz Harnish, and Hans Werner Aiegler. Phosphorus sludge is utilized to make elemental phosphorus. The sludge is mixed with phosphate rock and the mixture is dried and agglomerated by any of the usual methods.

U.S. Pat. No. 2,267,077, Dec. 23, 1941, George W. Burke. Dense hard cakes of phosphorus sludge are formed. The cakes are subjected to heat to vaporize the phosphorus.

U.S. Pat. No. 4,372,929, Feb. 3, 1983, James C. Barber. A process is disclosed for agglomerating discrete particles of phosphate ore. A mineral acid, an alkaline fluid and water are added to the phosphate ore and the mixture is tumbled to form agglomerates. The agglomerates are indurated by heating at a temperature in the range of 120° to 150° C.

U.S. Pat. No. 4,373,893, Feb. 15, 1983, James C. Barber. A bench-scale apparatus is described for agglomerating discrete particles. A mineral acid, an alkaline fluid and water are tumbled in the bench-scale apparatus to form the agglomerates.

U.S. Pat. No. 4,421,521, Dec.20, 1983, James C. Barber. Carbon particles are agglomerated for use as a reducing carbon in phosphorus furnaces. A mineral acid, an alkaline fluid and water are tumbled in a rotating cylinder to form agglomerates. The agglomerates are indurated by heating in the temperature range of 120° to 150° C.

U.S. Pat. No. 3,076,248, Feb. 5, 1963, Wendell L. Darrow and Joseph W. Kass. Phosphate agglomerates are prepared and said agglomerates are heated for 15 to 25 minutes in the temperature range of 2250° to 2500° F.

U.S. Pat. No. 3,760,048, Sep. 18, 1973, James K. Sullivan and Richard L. Howard. Calcined agglomerates are prepared from western phosphate shale. The ore is crushed and agglomerated by briquetting followed by drying for 15 minutes in the temperature range of 2000° to 2500° F. on a nonagitated grate.

U.S. Pat. No. 3,522,338, Jul. 23, 1970, Theodore E. Kass and Robert J. Gleason. Granular calcium phosphate ore containing silica is agglomerated by the hot briquetting process. The mixture is calcined in the temperature range of 1400° to 1900° F. prior to briquetting.

U.S. Pat. No. 3,104,952, Sep. 24, 1963, Rufus G. Hartig, Phosphoric acid is added to phosphorus sludge and the mixture is steam distilled. A gaseous mixture is obtained by distillation which is comprised of steam and elemental phosphorus.

U.S. Pat. No. 4,481,176, Nov. 6, 1984, David L. Dodson, Bruce D. Pate, and Philip C. Rogers. The size of particles in phosphorus sludge is reduced and the sludge is filtered to recover phosphorus.

U.S. Pat. No. 4,081,333, Mar. 23, 1978, William Samuel Holmes, Edward James Lowe, and Ernest Reginal Brazier. An apparatus is described for distilling phosphorus sludge. Molten lead is used as the heating medium.

U.S. Pat. No. 4,492,527, Jan., 8, 1985, David A. Crea. A process is disclosed for the recovery of elemental phosphorus from waste ponds.

U.S. Pat. No. 4,608,241, Aug. 26, 1986, James C. Barber. Solid wastes containing elemental phosphorus are distilled to obtain elemental phosphorus. Residue from distillation is smelted to produce additional elemental phosphorus. The phosphorus is burned to produce phosphoric acid.

U.S. Pat. No. 4,649,035, Mar. 10, 1987, James C. Barber. Solid wastes containing elemental phosphorus are burned to produce impure phosphorus oxides which are hydrated to produce a mixture of acids. Said acids are recycled.

U.S. Pat. No. 4,656,020, Apr. 7, 1987, James C. Barber. Solid wastes containing elemental phosphorus are distilled to obtain elemental phosphorus. Residue from distillation is smelted to produce elemental phosphorus.

Great Britain Patent No. 981,420, Jan. 27, 1965, Edward James Lowe. Invention is a process for distilling phosphorus sludge at reduced pressure to avoid high temperatures.

U.S. Pat. No. 3,531,250, Sep. 29, 1970, Arnulf Hinz. Sludge formed by dressing phosphate ores with mineral acids is mixed with finely ground phosphate ore and the resulting mixture is used for making shapes suitable for smelting in an electric furnace. The phosphate sludge can be used alone or precipitator dust can be added. The shapes may first be dried or they may be sintered and then smelted to produce elemental phosphorus.

Canadian Patent No. 956,433, Oct. 22, 1974, William B. Dancy. A method is disclosed for the production of elemental phosphorus and tricalcium phosphate by the thermal reduction of monocalcium phosphate.

U.S. Pat. No. 3,923,961, Dec. 2, 1975, William B. Dancy. Elemental phosphorus and animal feed grade tricalcium orthophosphate are produced by thermal reduction of monocalcium phosphate in a conventional rotary or fluosolids kiln by admixing the phosphate with an excess of carbon, forming the mixture into briquettes or pellets, heating the briquettes rapidly to a temperature of about 2100° to 2400° F., and recovering the phosphorus vapors and the tricalcium orthophosphate as residue.

Russian Patent No. 350,576, Feb. 6, 1977. Crude phosphorite can be granulated for production of elemental phosphorus by mixing phosphorite ore fines with powdered ferrophosphate then with an aqueous suspension containing dust from a Cottrell precipitator and some sodium polyphosphate. The mixture is granulated, dried, and calcined. Ferrophosphate is applied to the surface of the granules.

The Chemical Abstracts Search Service (CAS) was requested to search the literature for information on phosphate smelting for the period 1985 to about 1996. CAS reported 177 disclosures and 13 were related to the subject matter of the present application.

1. Reducing agent, Makov, E. P.; Kopbasaros, M. T.; Chepurko, N. V.; Yankina, L.; Prikhod ko, V. G.; Baizhanov, K. K.; Bobir, N. M.
   From: Otkrytiya, Izobret. 1985, (15), 63.
   Russian patent 82SU-3466555.
   The reducing agent is prepd. from coke fines primarily for the manuf. of P by mixing coke fines with a mineral binder and the mixt. is granulated. The mech. strength of the granules is increased by pretreating the mineral binder with $H_3PO_4$ [1: (0.06–0.4) wt. ratio] and mixed with coke fines at a (0.45–1.0): 1 wt. ratio.

2. Removing phosphorus from sludges. Beskin, M. D.; Smirnova, N. A.; Semenov, V. N.
   From: Otkrytiya, Izobret. 1985, (35), 86 Russian patent 84SU-3724842.
   P., with a low content of org. contaminants, is prepd in a continuous process by drying sludge, evapg. P at 0.3–3.0 $m^3$-min. by heating, and heating the vapor to 400–600° at 20–30°/min. heating rate before condensing.

3. Production of phosphorus and phosphoric acid (included in prior art for U.S. Pat. No. 4,968,499),
   James C. Barber
   U.S. Pat. No. 4,608,241.
   A multistep process for treating P-contg. waste, e.g., from $H_3PO_4$ plants, is described. The steps include: (1) distg. the waste to sep. P and water, which are condensed and sepd. into condensable and non-condensable gases; (2) agglomerating the residue with a binder and smelting the agglomerate in a submerged-arc furnace; (3) combining and burning the P from steps 1 and 2 to give $P_2O_5$; and (4) treating the $P_2O_5$ with water to give aq $H_3PO_4$. Processes are also disclosed for sepg. elemental P from the waste, converting the residue to granular fertilizer, and making suspension fertilizer from water contg. the P. App. for the processes is described in detail with diagrams and flow charts.

4. Effect of agglomerate coarseness on the gas permeability of phosphorus furnace charges.
   Shumakov, N. S.; Sandybaev, S. S.
   Kompleksn. Ispol'z. Miner. Syr'ya (1987), (4), 71–4.
   The effect of the particle-size distribution in a charge contg. phosphorus ore agglomerate 80, coke 10, and quartz 10% on the gas penetrability in a furnace for P manuf. was studied. The gas penetrability decreased with increase of the content of particles with av. size <1–3 mm. The results were used for the optimization of the sintering of a P ore. Thus, the recycled sinter particle size was decreased from $\leq 8$ mm to $\leq 6$ mm in sintering. The productivity of the ore sintering machine was increased by 2.3% due to the decrease of the amts. of the recycled material.

5. High pressure steam distillation process for the recovery and purification of phosphorus. Srivastava, V. K.; Saxena, Aiki; Ramani, M. P. S.
   Indian J. Technol. (1987), 25 (3), 141–5.
   The selection of a high-pressure steam distn. for puriffi. and recovery of P from P-bearing sludge is discussed. Optimization of operating pressure for min. cost of processing reveals a flat optima in the range of 6–9 $kg/cm^2$, i.e. 160–175°. The process is economically lucrative and simple with added advantage of lower As content in the recovered salable product.

6. Method of recovering phosphorus from slime. Khusainov, B. T.; Moldabekov, Sh. M.; Kopbasarov, M. T.; Ospanov, Zh. O.; Shapiro, L. D.; Oraltov, T. A.; Srazhdinova, G. L.
   From: Otkrytiya Izobret. 1987, (27), 90.
   Russian Patent 85SU-3987688.
   The process includes diln. of the sludge, heating to the b.p. and holding at this temp. while the water content in the sludge is maintained const., and sepn. of P. In order to reduce the scale formation in the app., the diln. is carried out with an aq. solu. of alkali metal sulfate of concn. 50–100 g/L, the amt. being detd. such that the wt. ratio of the sludge: metal sulfate solu. is 1: 1–2. The process is carried out for 50–70 min. until the pH of the soln. reaches 6.

7. Recovery of phosphorus from waste mud from electrothermal phosphorus production. Nield, Michael A.; Robbins, Basil N.
   U.S. Pat. 4,762,697
   The title process consists of heating the mud to boil off water and then to boil off yellow P, which is subsequently condensed. The residual P is then removed mainly by burning off in air along with some volatilization, to increase the recovery rate of solids from the waste material compared to removal of residual P by volatilization under N. A significant improvement in processing rate is achieved at the expense of a minor loss of recoverable P. A charge of 1327 kg, mud of compn. water 61, P 30, and solids 9% was placed in a mud still and heated under flowing N to distil water over the 1st. h. Distn. of P followed, peaking after 1.9 h, then decreasing and remaining steady after 3.3 h, at which point the N flow was replaced with a flow of air. After 30 min of air flow, heating was discontinued; the still contents rose in temp. to 640°, and the off-gas temp. rose steadily for 2 h. The condenser off-gas phosphorescence, which was replaced by a flow of white $H_3PO_4$ mist in N; after 4 h., the off-gas contained 4% O. After a total of 7.4 h. processing, 120 kg. P-free solid residue remained; the residue recovery rate was 162.2 kg/h and 7% of the recoverable P was lost as $P_2O_5$.

8. Phosphorus recovery from phosphorus-containing byproducts. Finley, Joseph H.; Hall, Richard E.
   U.S. Pat. No. 4,783,328

P values from wet-acid raffinate and the nodule fines from an elec. P furnace are recovered as elemental P by forming into briquets, heating the briquets to curing temps., and charging the cured briquets into the elec. P furnace in the presence of coke and a fluxing agent. Thus, a mixt. contg. 70 nodule fines and 30 wt % binder dust was combined with a raffinate contg. 27.6 $P_2O_5$ and 9.8 wt. % water. Pellets were prepd. at 4000 psi and cured at 200°. When tested, 27.6% of cured pellets contg. a raffinate binder were abraded as compared to 100% of cured pellets without a raffinate binder.

9. Phosphate feed material for phosphorus electric furnace.
   Finley, Joseph H.
   U.S. Pat. 4,806,326

In the manuf. of elemental P by the elec. furnace method, in which the comminuted phosphate ore is compacted into shapes and calcined to give a furnace feed material of calcined phosphate nodules, the fines formed by abrasion of the phosphate nodules are mixed with comminuted phosphate ore in the presence of sufficient $H_3PO_4$ and agglomerated. Such agglomerates are more resistant to abrasion and thus generate less nodule fines.

10. Renewable energy for production of elemental phosphorus. Barber, James C. Proc. Intersoc. Energy Convers. Eng.
    Conf. (1989), 24th (Vol. 4), 1743–8 methods are proposed for use in smelting phosphate ores in submerged arc furnaces that decrease the overall energy requirement by 40%. The feed phosphate ore is agglomerated and the feed components have matching sizes for avoiding segregation in the furnace. The byproduct furnace gas of phosphate-ore smelting, consisting mainly of CO and H and having a heating value of 343 Btu/ft$^3$ and a potential energy that is 65% of the smelting energy that is supplied as electricity, can be used to generate some of the elec. power that is used in the smelting. Wood pellets can be used as the reducing C instead of metallurgical and petroleum coke and in firing a boiler for generating the elec. power for the smelting.

11. Phosphorus recovery from phosphorus mud. Nield, Michael A.; Robbins, Basil N.
    Canadian patent 1267267.

The title process comprises (a) completely boiling off the water from the waste material, (b) boiling off yellow P from the waste material, and (c) boiling off residual P from the treated waste material. An inert gas, e.g., N, is blown through the waste material during stages a and b, and an $O_2$-contg. gas e.g., air, is used in stage C to burn off the residual P. This method decreases the time required to process P mud to a safety disposable form.

12. Use of slags formed during phosphoric sludge incineration in cyclone furnaces as a binder during production of phosphorite pellets. Shevchenko, N. P.; Ulanova, N. M.; Serazetdinov, D. Z.
    Izv. Nats. Akad. Navk Resp. Kaz., Ser. khim. (1994), (3), 86–18.

Use of phosphoric slags from cyclone furnaces as a binder for prepn. of phosphorite pellets for P manuf was investigated. Addn. of 5–10% slag was optimum. Strength of resulting pellets was comparable or higher than that of conventional pellets. According to decarbonation kinetics of phosphorite, the optimum calcining temp. was 900° compared to the conventional temp. of 1150–1200°.

13. Removal of elemental phosphorus from electric furnace sludges of various origins. Jefcoat, Irvin A.; Potluri, Sundeep.
    Environ. Prog (1995), 14 (2), 84–7

A method developed at the University of Alabama eliminated the toxic and flammable characteristics of elemental P from byproduct sludges produced from operation of elec. furnaces at widely sepd. facilities. The removal process is 1st order with respect to elemental P conc. with a rate const. of 0.02/min. The residuals produced contain Cd, Cr, and Pb above the TC LP limit and thus will require further treatment.

DETAILED DESCRIPTION OF THE INVENTION

Figure 1:
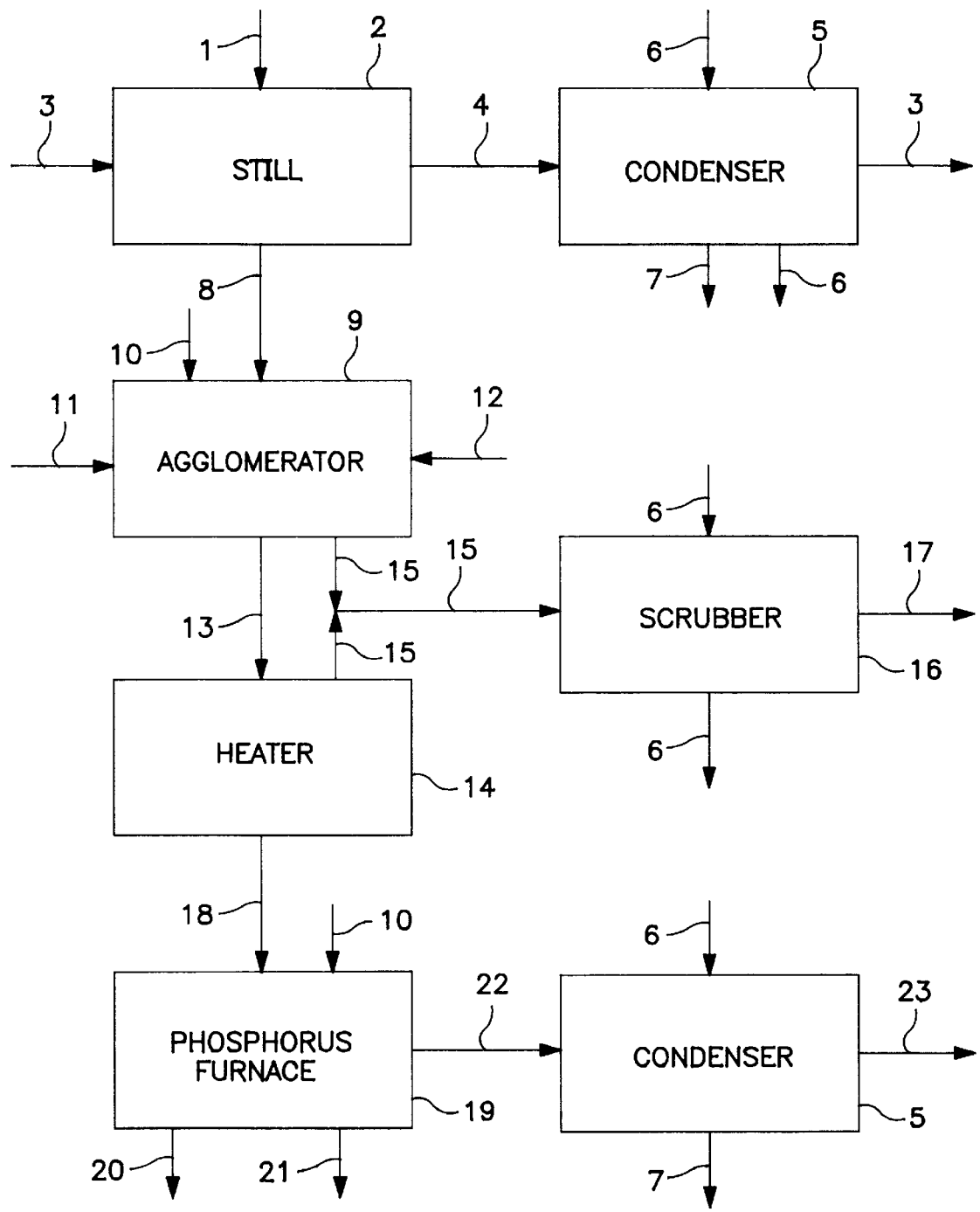
FIG. 1 is a process for preparing phosphatic feedstock from phosphorus sludge. And the diagram shows how the feedstock can be smelted to produce elemental phosphorus.

Phosphours sludge 1 is heated in still 2 to vaporize white phosphorus and to convert white phosphorus to red phosphorus. Non-oxidizing gas 3 is added to still 2. A gas mixture 4 comprised of non-oxidizing gas and vaporized white phosphorus flows to condenser 5. Gas mixture 4 is cooled by contacting said mixture with ammonium fluosilicate solution 6, thereby condensing elemental phosphorus 7. Ammonium fluosilicate solution 6 is discharged from condenser 5.

Inorganic residue 8 containing phosphatic material is agglomerated in agglomerator 9. Reducing carbon 10, ground phosphate 11, and phosphoric acid 12 are added to agglomerator 9. Ground phosphate 11 and phosphoric acid 12 are added in proportions needed to form calcium phosphate which is a binder for agglomerating particles in inorganic residue 8.

Agglomerates 13 are hardened by heating in heater 14. Exhaust gases 15 from agglomerator 9 and heater 14, containing $P_2O_5$, fluorine compounds, and elemental phosphorus are scrubbed in scrubber 16. Exhaust gases 15 are scrubbed and elemental phosphorus is condensed by contacting the gases with ammonium fluosilicate solution. Exhaust gas 17 containing air is discharged from scrubber 16. Ammonium fluosilicate solution 6 is discharged from scrubber 16.

Hardened agglomerates 18 are smelted in phosphorus furnace 19. Reducing carbon 10 is fed to phosphorus furnace 19. Phosphatic material in hardened agglomerates 18 reacts with reducing carbon 10 forming elemental phosphorus. Silica and CaO in hardened agglomerates 18 react to form calcium silicate slag 20. Reducing carbon 10 reacts with $Fe_2O_3$ in hardened agglomerates 18 forming ferrophosphorus 21.

Furnace gas 22 is a mixture consisting of carbon monoxide and elemental phosphorus. The gases are cooled in condenser 5 by contacting said gases with ammonium fluosilicate solution 6. Elemental phosphorus 7 is recovered by condensation and condenser exhaust gas 23, consisting of carbon monoxide, is discharged from condenser 5.

EXAMPLE I

White (or yellow) elemental phosphorus melts at 111.4° F. and the liquid boils at 536.9° F., as reported in, "Development of Processes and Equipment for Production of Phosporic Acid". M. M. Striplin, Jr., Tennessee Valley Authority, Chemical Engineering Report No. 2, 1948. Phosphorus-containing wastes must be heated to a temperature near the boiling temperature in order to separate elemental phosphorus from inorganic solids at a rate high enough for distillation to be practical. The vapor pressure of liquid elemental phosphorus was reported in "Phosphorus: Properties of the Element and Some of Its Compounds", Thad D. Farr, Tennessee Valley Authority, Chemical Engineering Report No. 8, 1950. Some of the vapor pressure data are given in table 2.

TABLE 2

| Vapor Pressure of Liquid Phosphorus | | |
|---|---|---|
| Temperature | | Vapor pressure, |
| ° C. | ° F. | mm. Hg. |
| 200 | 392 | 120 |
| 210 | 410 | 157 |
| 220 | 428 | 202 |
| 230 | 446 | 258 |
| 240 | 464 | 327 |
| 250 | 482 | 409 |
| 260 | 500 | 508 |
| 270 | 518 | 626 |
| 280 | 536 | 764 |
| 290 | 554 | 926 |

Phosphorus-containing wastes are comprised of inorganic solids, elemental phosphorus, and water. Elemental phosphorus and water can be separated from the inorganic solids by heating the wastes. When the wastes are heated elemental phosphorus and water are vaporized without vaporizing the inorganic solids.

A practical lower temperature for heating the wastes may be deduced from the vapor pressure data shown in table 2. At 392° F., for example, the vapor pressure of liquid phosphorus is only 15.8 percent of atmospheric and separation of elemental phosphorus from inorganic solids by heating may be too slow to be practical. The minimum temperature for heating phosphorus-containing wastes to separate elemental phosphorus from inorganic solids was taken to be 400° F. But heating to the boiling point (536.9° F.), or higher, is desirable to obtain rapid volatilization of elemental phosphorus.

EXAMPLE II

The maximum temperature for heating phosphorus-containing wastes to separate elemental phosphorus from inorganic solids was thought to be 536.9° F., or higher, to obtain rapid or complete separation. However, some of the liquid elemental phosphorus is converted to solid amorphous elemental phosphorus by heating to temperatures as high as 536.9° F. The solid, amorphous form of the element is called "red" phosphorus. Unfortunately, the vapor pressure of red phosphorus is low up to its melting temperature of 1094° F.

Data on the vapor pressure of red phosphorus are reported in a TVA publication titled, "Phosporus: Properties of the Element and Some of Its Compounds". Table 3 shows vapor pressure of red phosphorus at temperatures above the boiling point of liquid elemental phosphorus.

TABLE 3

| Vapor Pressure of Red Phosphorus | | |
|---|---|---|
| Temperature | | Vapor pressure, |
| ° C. | ° F. | mm. Hg. |
| 350 | 662 | 0.3 |
| 400 | 752 | 1.1 |
| 450 | 842 | 2.9 |
| 500 | 932 | 7.1 |
| 550 | 1022 | 21 |
| 589.5 (M.P.) | 1094 | 43 |

In table 3 it is evident phosphorus-containing waste must be heated to the melting point of red phosphorus (1094° F.) in order to obtain complete separation of elemental phosphorus from the inorganic solids. When red phosphorus melts the resulting liquid phosphorus will rapidly vaporize and complete separation of elemental phosphorus from the inorganic solids can be obtained. But equipment to heat phosphorus-containing wastes is constructed of steel and iron in the steel is rapidly attacked by elemental phosphorus at temperatures as high as 1094° F. Elemental phosphorus combines with the iron forming iron phosphides.

EXAMPLE III

A pilot plant was constructed at TVA to investigate the separation of elemental phosphorus from inorganic solids by heating phosphorus-containing waste. The pilot plant consisted of a horizontal cylinder which could be rotated. The cylinder could be heated on the outside with gas burners. Batches of phosphorus-containing wastes were placed in the cylinder through an opening which could be closed. The cylinder was rotated, and heated. Nitrogen was added to the rotating cylinder through a sealed pipe in one end of the rotating cylinder. Nitrogen, water vapor and phosphorus vapor flowed through a sealed pipe in the opposite end of the condenser.

A diagram of the pilot plant is shown in the book "Solid Wastes", edited by C. L. Mantell, and referred to on page 8 under Prior Art.

Five runs were made and results were reported in the progress report as follows.

The char [residue] from each pilot-plant run contained some red phosphorus, but the percentage decreased as the temperature and holding time in the vaporizer [rotating cylinder] were increased In run I the temperature was held above 600° F. for 1 hour (maximum-660° F.) and the char [residue] contained 18.9 percent red phosphorus. In runs 2, 3, and 4 the temperature was held above 600° F. for 2.5 to 3.0 hours (maximum-700–750° F.) and the char [residue] contained 4.4 to 6.0 percent red phosphorus. In run 5 the maximum temperature was increased to 830° F. (a portable potentiometer was used instead of the recorder to measure temperatures above 700° F.), and the holding time was 1.0 hour; red phosphorus in the char [residue] was only 3.5 percent.

Failure to completely remove red phosphorus from char [residue] (in pilot-plant runs after run 1) was not known until chemical analyses had been completed. The chars [residues] had no color indicating the presence of red phosphorus, and they would not burn in air when exposed to a flame. However, the results shown in table II [not included] indicate that the proportion of red phosphorus in the char [residue] can be decreased by increasing either the holding time above 700° F. or the maximum temperature. Results from run 5 indicate that a temperature of 850° to 900° F. for 1 hour will lower the red phosphorus content of the char [residue] containing 3 to 5 percent red phosphorus did not fume when handled.

EXAMPLE IV

Complete separation of elemental phosphorus from inorganic solids was not achieved in the pilot plant in example III. There was no evidence of white phosphorus remaining in the residue after heating phosphorus-containing wastes for one hour at a temperature greater than 600° F. However, the residue contained 18.9 percent red phosphorus. The waste would continue to be toxic because complete separation of elemental phosphorus was not achieved. Nevertheless, the rate of volatilization of liquid phosphorus may be too low unless the phosphorus-containing waste is heated to 600° F.

EXAMPLE V

Samples of phosphorus sludge were treated with benzene to dissolve elemental phosphorus. Inorganic solids remaining undissolved were analyzed and the composition is given in table 4.

TABLE 4

Composition of Inorganic Solid in Phosphorus Sludge

| Constituent | Percent |
|---|---|
| $P_2O_5$ | 32 |
| F | 23 |
| CaO | 8 |
| $SiO_2$ | 7 |

The inorganic material has a composition suitable for smelting in electric furnaces to produce elemental phosphorus. The material has a $SiO_2$:CaO weight ratio of 0.875 indicating the proportion of $SiO_2$ is sufficient to combine with CaO and form a slag with properties suitable for smelting phosphatic material. Little or no silica rock would be required for smelting the solids.

The percent $P_2O_5$ in the phosphate-plus-silica rock is an indication of the grade of feedstock when phosphatic materials are smelted in electric furnaces. A percent $P_2O_5$ in the phosphate-plus-silica rock of about 25 percent or higher is needed for satisfactory furnace operation. However, the inorganic solids in phosphorus-containing wastes have a percent $P_2O_5$ in the phosphate-plus-silica of 32 percent. The energy required to smelt the inorganic solids will be less than it is for feedstock prepared from apatitic phosphate.

EXAMPLE VI

One of TVA's phosphorus-containing waste is precipitator dust and this waste was generated when electrostatic precipitators were used to remove particulates from gases at phosphorus furnaces. The precipitator dust is a sludge-like material which may contain up to 1.3 percent elemental phosphorus but the average phosphorus content on a dry basis is only about 0.4 percent.

A shortage of fertilizer materials during World War II led TVA to convert the waste into a form that could be used as a fertilizer. The waste was aerated in a ribbon conveyor to oxidize the elemental phosphorus followed by granulation in a pug mill. The granulated material was distributed as fertilizer.

Oxidation of elemental phosphorus was incomplete and distribution of precipitator dust as fertilizer had to be discontinued. Elemental phosphorus remaining in the precipitator dust was a fire hazard. Nevertheless, experience oxidizing precipitator dust can be used to estimate maximum allowable white phosphorus content in heated phosphorus-containing waste.

The following are preferred conditions for treating TVA's phosphorus-containing waste, based on pilot plant runs and experience aerating precipitator dust.

Heating temperature 600°–660° F.

Heating time Heat phosphorus-containing waste to reduce white phosphorus content to a maximum of 0.2 percent.

Non-ferrous materials may be used for construction of the heating equipment and phosphorus-containing wastes may be heated to approximately 1200° F. to melt and vaporize red phosphorus. And it may be found that the heated material can be safely converted into feedstock for phosphorus furnaces when the maximum white phosphorus content is 0.5 percent.

EXAMPLE VII

Residue obtained after heating phosphorus-containing waste can be agglomerated so as to prepare the material for smelting in phosphorus furnaces. Laboratory experiments were made to investigate binders that can be used to agglomerate coke fines and phosphatic materials. Although several binders were investigated, calcium phosphates were preferred because the particles hold together under the high temperature conditions encountered in phosphorus furnaces. Furthermore, calcium phosphates binders are smelted thereby increasing the yield of elemental phosphorus. Monocalcium phosphate is the preferred calcium phosphate binder because the weight ratio of calcium to phosphorus is lower than it is in either dicalcium phosphate and tricalcium phosphate. The quantity of byproduct slag will be lower with monocalcium phosphate binder than with the other calcium phosphates.

EXAMPLE VIII

Results of laboratory experiments showed that the formulation in table 5 was adequate for the agglomeration of coke fines.

TABLE 5

Formulation for Agglomeration of Coke Fines

| Material | Wet Wt., tons | Dry Wt., tons | Water tons |
|---|---|---|---|
| Coke fines, 8.2% water | 330 | 302.9 | 27.1 |
| Ground phosphate, 1% water | 42 | 41.6 | 0.4 |

TABLE 5-continued

Formulation for Agglomeration of Coke Fines

| Material | Wet Wt., tons | Dry Wt., tons | Water tons |
|---|---|---|---|
| Phosphoric acid[a] | 63 | 40.3 | 22.7 |
| Water | 85 | 0 | 85.0 |
| Total Water | | | 135.2 |

[a]Analysis of merchant-grade wet-process phosphoric acid used in experiments was as follows: $P_2O_5$, 53.0%; $Fe_2O_3$, 1.8%; $Al_2O_3$, 1.7%; $SO_3$, 3.0%; F, 1.1%; Mg, 0.4%; and solids, 3.0%. Total is 64.0% and water content is taken to be 100 − 64 = 36%.

Coke fines were tumbled in a rotating cylinder with ground phosphate, phosphoric acid, and water. The proportions of ground phosphate and phosphoric acid were adjusted so as to form monocalcium phosphate binder. Wet agglomerates were formed by tumbling the coke fines with monocalcium phosphate.

Wet agglomerated coke fines were heated to harden and dry the material, so as to prepare anhydrous feedstock for electric furnaces. In the phosphorus furnace carbon will combine with oxygen in the phosphatic material to produce elemental phosphorus and byproduct carbon monoxide.

EXAMPLE IX

Residue from the heating of phosphorus-containing wastes can be converted into phosphorus furnace feedstock by agglomerating the material as described in example VIII. Residue can replace coke fines in the formulation given in table 5 and agglomerates will be formed by tumbling the wet material with calcium phosphate binder Monocalcium phosphate binder can be prepared by reacting apatitic phosphate with phosphoric acid as carried out for production of superphosphate fertilizers. The technology for the preparation of monocalcium phosphate binder is similar to that for superphosphate fertilizer. Technology for the manufacture of superphosphate fertilizer can be obtained from the following sources.

1. "Development of Processes for Production of Concentrated Superphosphate", G. L. Bridger, Tennessee Valley Authority, Chemical Engineering Report No. 5, 1949.
2. "Superphosphate: Its History, Chemistry And Manufacture" Soil and Water Conservation Research Division, Agricultural Research Service, U.S. Department of Agriculture and Office of Agricultural and Chemical Development, Tennessee Valley Authority, December, 1964.

Agglomerates prepared by the process described in example VIII are wet and weak, but agglomerates are dried and hardened by heating. Chapter VI titled, "Quick-Curing Process", pages 109–154 in No. 1 provides technical information which can be used as a basis for preparing agglomerates having size and hardness suitable for phosphorus furnace feedstock. The section of No. 2 on page 255, titled, "Principles of Agglomeration", provides information on size enlargement which may be of benefit in preparing phosphorus furnace feedstock.

EXAMPLE X

When the feedstock prepared from heated phosphorus-containing waste is smelted in phosphorus furnaces the material will be subjected to a temperature of about 2700° F. Since this temperature is about 1606° F. above the melting point of red phosphorus the solid phosphorus will melt forming liquid phosphorus. Temperatures in the phosphorus furnace are about 2163° F. higher than the boiling point of liquid phosphorus and the red phosphorus will be rapidly vaporized Phosphorus vapor can be condensed to recover liquid elemental phosphorus in accordance with prior art for manufacture of elemental phosphorus. Thus elemental phosphorus in phosphorus-containing waste is recovered. As shown in table 1 the elemental phosphorus in phosphorus sludge that has accumulated at TVA will have an estimated value of $114.6 million.

Having thus described the invention, the following is claimed:

1. A process for making phosphorus furnace feedstock from phosphorus-containing waste material said process comprising the following steps:
    (a) heating phosphorus sludge to vaporize liquid phosphorus and water and to convert white phosphorus to red phosphorus;
    (b) adding a nonoxidizing gas to the vapors formed in step (a), thereby obtaining a gas mixture containing a nonoxidizing gas, phosphorus vapor, and steam;
    (c) cooling the gas mixture step (b) by contacting said mixture with water, thereby condensing said phosphorus vapor and said steam;
    (d) separating elemental phosphorus from the water of step (c);
    (e) collecting said elemental phosphorus of step (d) as a product;
    (f) collecting residue from step (a), thereby obtaining a mixture of inorganic solid and red phosphorus;
    (g) agglomerating said mixture of step (f) with the aid of a binder; and
    (h) feeding agglomerates from step (g) to a phosphorus furnace.

2. The process of claim 1 wherein said phosphorus sludge of step (a) contains 2 to 95 percent elemental phosphorus.

3. The process of claim 1 wherein said phosphorus sludge of step (a) is heated to a temperature in the range of 400° to 1100° F.

4. The process of claim 1 wherein said nonoxidizing gas of step (b) is selected from the group consisting of nitrogen, carbon monoxide, and carbon dioxide.

5. The process of claim 1 wherein said binder of step (g) is calcium phosphate.

6. In a process of smelting phosphatic materials in a furnace to produce elemental phosphorus and a phosphorus-containing waste and maximizing the recovery of additional elemental phosphorus from said phosphorus-containing waste, the improvement comprising the following steps:
    (a) heating said phosphorus-containing waste to vaporize the liquid phosphorus and water contained in the waste and to convert white phosphorus to red phosphorus;
    (b) adding a nonoxidizing gas to the vapors formed in step (a), thereby obtaining a gas mixture containing a nonoxidizing gas, phosphorus vapor, and steam;
    (c) cooling the gas mixture of step (b) by contacting said mixture with water, thereby condensing said phosphorus vapor and said steam;
    (d) separating and collecting liquid elemental phosphorus as a product from the water of step (c);
    (e) collecting residue from step (a), thereby obtaining a mixture of inorganic solid and red phosphorus;
    (f) agglomerating said mixture of step (e) with the aid of a binder;

(g) feeding agglomerates from step (f) as feedstock to a phosphorus furnace to convert the red phosphorus content thereof to phosphorus vapor; and (h) recovering additional liquid elemental phosphorus from the phosphorus vapor of step (g).

7. In the process according to claim 6 wherein said phosphorus-containing waste of step (a) contains 2 to 95 percent elemental phosphorus.

8. In the process according to claim 6 wherein said phosphorus-containing waste of step (a) comprises precipitator dust generated when electrostatic precipitators are used to remove particulates from phosphorus furnace gases.

9. In the process according to claim 6 wherein said phosphorus-containing waste of step (a) is heated to a temperature in the range of 400° to 1100° F.

10. In a process according to claim 6 wherein said nonoxidizing gas of step (b) is selected from the group consisting of nitrogen, carbon monoxide, and carbon dioxide.

11. In a process according to claim 6 wherein said binder of step (f) is calcium phosphate.

12. In a process according to claim 6 wherein the agglomerates of step (f) are heated to a temperature of about 2700° F. in step (g).

* * * * *